Nov. 10, 1925.
R. J. CALLAHAN
ELECTROWELDING GRIP
Filed Nov. 8, 1924
1,561,055
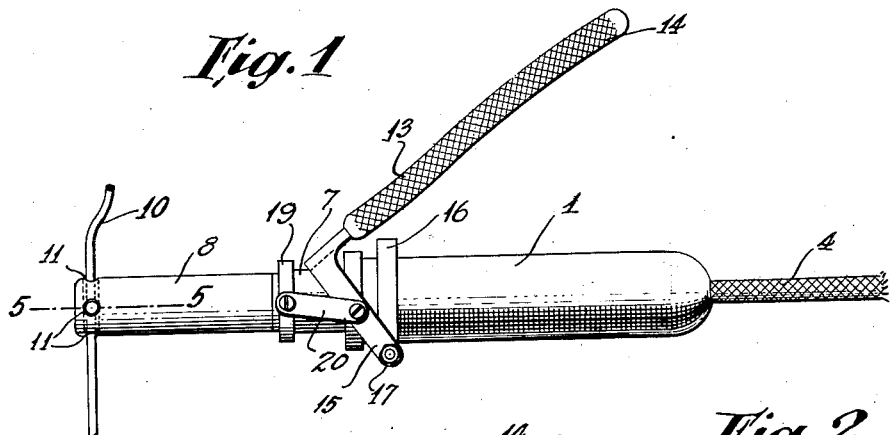
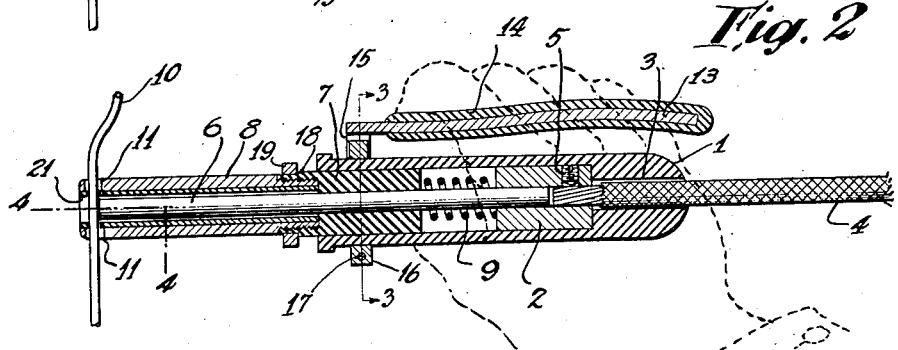
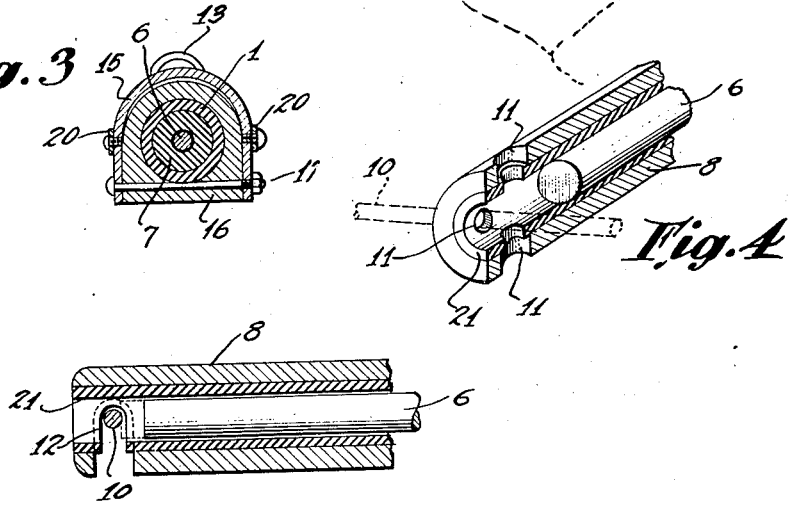
INVENTOR
Richard J. Callahan
BY
James L. Stewart
his ATTORNEYS.

Patented Nov. 10, 1925.

1,561,055

UNITED STATES PATENT OFFICE.

RICHARD J. CALLAHAN, OF NEWARK, NEW JERSEY.

ELECTROWELDING GRIP.

Application filed November 8, 1924. Serial No. 748,534.

*To all whom it may concern:*

Be it known that I, RICHARD J. CALLAHAN, a citizen of the United States, residing at Newark, county of Essex, and State of New Jersey, have invented a certain new and useful Electrowelding Grip, of which the following is a specification.

This invention is a device to be used by electrowelders, and is adapted, more especially, for use in that character of welding wherein the current is fed directly through the strip of welding metal employed in the making of the weld.

In welding of this character, the current feed wire is directly connected to the strip of welding metal and the end of said strip is held in juxtaposition with the joint to be welded either by grasping the strip directly in the hand, while employing a rubber glove as insulation, or by using insulated plyers to hold and feed the strip during the welding operation. Welding in this manner is a source of continued hazard as the operator is apt to receive electrical shocks or burns.

The object of the present invention is to provide simple and efficient means for securing the current feed wire to a strip of welding metal and which means is also constituted to afford a convenient grip or holder by which said strip may be tightly held by a workman without fear of injury during the welding operation.

Speaking generally, the present invention embodies a suitable handle preferably of insulating material provided with a fixed gripping member completely insulated from the exterior of the handle and having electrical connection with the current feed wire interiorly of the handle. With one end of the handle is associated a relatively movable gripping member shaped to receive a strip of welding metal and operable by a lever supported on the handle to shift the movable gripping member into a position wherein the strip will be tightly gripped between the movable gripping member and the fixed gripping member, while making electrical connection with the latter. The lever, which is thoroughly insulated, is positioned to be conveniently operated by the hand, while grasping the handle, for the purpose of firmly holding the strip of welding metal in position to receive the current feed, but is so constructed that said strip may be readily released by loosening the grip of the hand upon the handle and lever.

An important feature of the invention resides in the fact that the operator is fully safeguarded against current shock or burns and of further importance is the ease with which the strip may be held or fed to its work.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of an electrowelding grip embodying the present invention.

Figure 2 is a central vertical section through the device.

Figure 3 is a transverse section on the line 3—3 of Figure 2.

Figure 4 is a fragmentary section perspective taken on the line 4—4 of Figure 2 and showing the parts in non-gripping relation; and, Figure 5 is a fragmentary section taken on the line 5—5 of Figure 1, and showing a modified arrangement.

Referring to the drawings, 1 designates a handle, shown as substantially cylindrical in shape and hollow throughout the greater portion of its length. This handle is in practice preferably made from suitable insulating material and is shaped and proportioned to be readily grasped in the hand.

Positioned within the handle 1 is a metallic coupling 2 provided, through its center, with a passage alined with a hole 3 formed through the rear end of the handle. A current feed wire 4 is adapted to be passed through the hole 3 and project into the coupling 2 to be firmly held in place therein by means of a set screw 5, as shown best in Figure 2.

Seated in the other end of the coupling is a rod 6, shown as cylindrical, and in practice this rod is preferably rigid with the coupling 2 and has a forced fit in the passage thereof. The rod 6 is sufficiently long to extend well beyond the open end of the handle and is guided or centralized with respect to the handle by an insulating plug 7 which has a sliding fit within the handle.

The plug 7 projects beyond the end of the handle and is interiorly threaded to receive the shank of a tubular gripping member 8 which, by the screw connection shown, is mounted upon the plug 7 for movement therewith. A spring 9 coiled about the rod 6 between the coupling 2 and the plug 7 normally forces the plug in a direction to move the outer end of the tubular gripping member 8 to a position well beyond the outer end of the rod 6 and beyond the end of this rod said tubular member is shaped to receive a strip of welding metal designated in the drawings by the reference character 10. The shaping of the tubular member for this purpose may be varied, but two very satisfactory forms are shown in the drawings.

From Figures 1 and 4, it will be noted that the extremity of the tubular member is provided with holes 11 arranged at ninety degrees to each other, and through either two of which the strip 10 may be passed as shown in these figures.

A more convenient arrangement is illustrated in Figure 6, wherein the tubular member is provided with a transverse slot 12 which extends a little more than half way through the tube and is of a width adapting it to be hooked over and straddle the strip 10. When the strip is occupying either set of holes 11, as shown in Figures 1 and 4, or the slot 12, as shown in Figure 5, it will be apparent that, if the tubular member 8 is retracted against the tension of the spring 9, the strip will be forced into engagement with the end of the rod 6 and will be tightly gripped and held in place. This operation is accomplished by means of a lever 13 having an integral yoke 15 at one end. The yoke is shaped, as shown in Figure 3, to straddle a fixed collar 16, mounted on the handle and to which collar the yoke is pivoted by a bolt 17.

The insulating plug 7 is stepped to form a shoulder 18 and against this shoulder seats a collar 19, which is connected, by means of links 20, to the yoke 15 of the lever. Under normal conditions, the pressure of the spring 9 will force the plug 7 in a forward direction so that the handle will partake of the position shown in Figure 1 and the tubular gripping member will be in the relative position to the outer end of the rod 6 shown in Figures 4 and 5.

If, however, the device is held in the hand, so that the hand will grasp the handle 1 and the lever 13, the lever may be forced into the position shown in Figure 2, during which operation, the tubular gripping portion will be retracted to force the strip 10 tightly against the end of the rod 6 to tightly grip the strip in position and simultaneously effect a good electrical connection between the strip and the end of the rod. Inasmuch as the opposite end of the rod is in electrical connection with the feed wire 4, current may be fed through the strip 10 to carry out the welding operation.

As long as the device is tightly grasped in the hand, as shown in Figure 2, the strip 10 will be firmly held in position, but, if it is desired to release the strip the hand may be loosened slightly to permit the spring 9 to shift the tubular gripping member slightly forward. This will bring about the loosening of the strip so that the device may be shifted longitudinally of the strip or the strip wholly removed therefrom.

It will be noted that the tubular member 8 is provided with an attached insulating lining 21, having openings corresponding to and juxtaposed with the holes 11 or slot 12. These openings in the lining 21 are, however, somewhat smaller than the corresponding openings in the part 8, so that the strip 10 is precluded from direct engagement with metallic part 8, whereby said part is, at no time, charged with electrical current.

Furthermore, the collar 19 is mounted on the insulated plug 7 so that the lever is thoroughly insulated even though the strip 10 does touch the tubular gripping member 8. As a further safeguard, the lever is encased within insulating material, as shown at 14 so that there the device may be handled without the slightest danger of electrical shocks or burns.

It will be apparent from the foregoing detailed description of the invention that the rod 6 and the tubular gripping member 8 constitute respectively fixed and relatively movable gripping members which not only serve to tightly support the strip of welding metal on the handle, but also provide a proper connection between the strip and the source of current supply. This invention therefore provides a simple, though highly convenient and safe grip for use by electrowelders and many of the hazards of this operation are eliminated through its use.

The accompanying drawings show the invention in its preferred practical form, but the invention is to be understood as fully commensurate with the appended claims.

Having thus fully described the invention, what I claim as new and desire to secure by Letters Patent is:

1. In an electrowelding grip, the combination of an element to which electrical current is supplied, another element adjustable with reference to the first element, a spring for normally forcing said elements into non-gripping relation, and manually operable means for causing said elements to grip a strip of welding material.

2. A device of the character described embodying a handle, relatively fixed and movable gripping members mounted on the handle and with one of which a current feed wire is adapted to be electrically connected, automatic means normally maintaining said gripping members in non-gripping relation, and manually operable means also mounted on the handle for shifting the movable member relatively to the fixed member to grip a strip of welding metal between said members and simultaneously establish electrical connection between said strip and the current feed wire.

3. A device of the character described embodying a handle, a pair of relatively insulated gripping members, one of which is rigid with the handle and the other of which is movable with respect thereto in a direction longitudinally of the first, means for electrically connecting one of said members with a current feed wire, a spring for normally forcing the gripping members into non-gripping relation, and manually operable means for shifting the movable member to cause said members to conjointly grip a strip of welding metal.

4. A device of the character described embodying an insulated handle, a pair of coaxial gripping members insulated from the handle and from each other, one of which gripping members is rigid with the handle and the other of which is movable with respect thereto in a direction longitudinally of the first, means for electrically connecting one of said members with a current feed wire, a spring for normally forcing the gripping members into non-gripping relation, and a hand operated lever mounted on the handle and operatively connected to the movable member to actuate the same and cause said members to conjointly grip a strip of welding metal.

5. A device of the character described embodying a hollow insulated handle, a rod extending from within the handle to a point beyond one end thereof, means, interiorly of the handle for electrically connecting a current feed wire to said rod, a slide mounted to travel longitudinally of the handle, a gripping member carried by the slide and shaped to engage a strip of welding metal, manually operable means associated with the handle for shifting the slide to cause the strip to be gripped by the rod and gripping member conjointly, and automatically operable means for normally maintaining the gripping member in a non-gripping position.

6. A device of the character described embodying a hollow insulated handle, a rod extending from within the handle to a point beyond one end thereof and coaxial therewith, means, within the handle to electrically connect the rod to a current feed wire, a slide mounted on the handle, a tubular member, carried by the slide coaxial with the rod and shaped, beyond the end thereof, to engage a strip of welding metal, an insulated pivoted lever overlying the handle and operatively connected with the slide, whereby the slide may be manually operated to draw such strip against the end of the rod to tightly grip the strip in place and simultaneously electrically connect the strip to the current feed wire, and a spring for normally forcing the tubular member into a non-gripping position.

7. In an electrowelding grip, the combination of an element to which electrical current is supplied, another element adjustable with reference to the first element and insulated therefrom, a spring forcing said elements normally into non-gripping relation, and manually operable means for causing said elements to grip a strip of welding material.

In testimony whereof, I have signed the foregoing specification.

RICHARD J. CALLAHAN.